United States Patent [19]

Tan et al.

[11] Patent Number: 5,534,613

[45] Date of Patent: Jul. 9, 1996

[54] BENZOBISAZOLE POLYMERS CONTAINING TRIARYLAMINO MOIETIES

[75] Inventors: Loon-Seng Tan, Centerville; Kasturi R. Srinivasan, Fairborn, both of Ohio

[73] Assignee: The United States of America as represented by the Secretary of the Air Force, Washington, D.C.

[21] Appl. No.: 380,177

[22] Filed: Jan. 26, 1995

[51] Int. Cl.$^6$ .................................... C08G 63/00
[52] U.S. Cl. .................. 528/176; 528/190; 528/206; 528/208; 528/210; 528/211; 528/219
[58] Field of Search .................................. 528/366, 176, 528/190, 206, 208, 210, 211, 219

[56] References Cited

PUBLICATIONS

Srinivasan et al., Poymer Preprint, vol. 35(1), 501–502, 1994.
T. D. Dang, S. J. Bai, D. P. Heberer, F. E. Arnold and R. J. Spry, "Ionic Conductivity of Conjugated Water–Soluble Rigid–Rod Polymers", *Journal of Polymer Science: Part B: Polymer Physics*, vol. 32, 1941–1950 (1993).
Patricia A. DePra, John G. Gaudiello and Tobin J. Marks, "Conductive Polymers Based upon Rigid–Rod Ultrahigh-Modulus Macromolecules. Electrochemical Doping of Poly(p-phenylenebenzobisthiazole–2,6–diyl)(PBT)", *Macromolecules* 1988, 2295–2297.
M. Ishikawa, M. Kawai and Y. Ohsawa, "Synthesis and properties of electrically conducting polytriphenylamines", *Synthetic Metals*, 40 (1991), 231–238.
C. Y–C Lee, J. Swiatkiewicz, P. N. Prasad, R. Mehta and S. J. Bai, "Third order non–linear optical properties of poly–p-phenylene benzobisthiazole and its novel composite with Zytel processed via methane sulfonic acid solution extrusion", *Polymer*, 1991, vol. 32, No. 7, 1195–1199.
Y. Oishi, H. Takado, M. Yoneyama, M–A Kakimoto and Y. Imai, "Preparation and Properties of New Aromatic Polyamides from 4,4'–Diaminotriphenylamine and Aromatic Dicarboxylic Acids", *Journal of Polymer Science: Part A: Polymer Chemistry*, vol. 28, 1763–1769 (1990).

K. R. Srinivasan, L–S Tan, S. J. Bai and R. J. Spry, "Aromatic Benzobisthiazole Polymers and Copolymers Incorporated with Electron–rich Triarylamino Moieties", *Polymer Preprints*, vol. 35(1), 501–502, 1994.
A. Troup, J. Mort, S. Grammatica and D. J. Sandman, "Direct Observation of Superexchange in a Disordered Molecular Solid", *Solid State Communications*, vol. 33, pp. 91–93 (1980).
C. S. Wang, J. Burkett, C. Y–C Lee and F. E. Arnold, "Structure and Electrical Conductivity of Ion–Implanted Rigid–Rod and Ladder Polymers", *Journal of Polymer Science: Part B: Polymer Physics*, vol. 31, 1799–1807 (1993).

Primary Examiner—James J. Seidleck
Assistant Examiner—Richard Jones
Attorney, Agent, or Firm—Charles E. Bricker; Thomas L. Kundert

[57] ABSTRACT

Polymers of the class rigid-rod aromatic heterocyclic polymers, having repeating units of the formula:

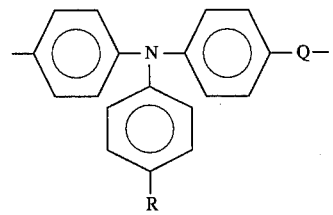

wherein R is selected from the group consisting of —H, —CH$_3$, —N(CH$_3$)$_2$ and —OH, and Q is

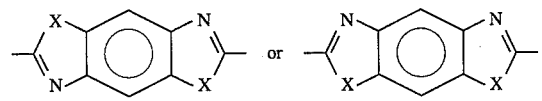

wherein X is —S— or —O—, exhibit increased electrical conductivity, as compared to rigid-rod aromatic heterocyclic polymers polymers not containing the triarylamino moiety.

11 Claims, No Drawings

BENZOBISAZOLE POLYMERS CONTAINING TRIARYLAMINO MOIETIES

RIGHTS OF THE GOVERNMENT

The invention described herein may be manufactured and used by or for the Government of the United States for all governmental purposes without the payment of any royalty.

BACKGROUND OF THE INVENTION

The present invention relates to new benzobisthiazole and benzobisoxazole polymer compositions containing an electron-rich triarylamine group for multifunctional high performance applications.

Rigid-rod poly(benzobisazole) (PBZ) polymers are well-known for their superior mechanical properties and high-temperature capability which are better than the state-of-the-art Aramids (e.g. Kevlar). The PBZ group includes poly(benzobisoxazole) (PBO), poly(benzobisthiazole) (PBT) and poly(benzobisimidazole) (PBI) polymers. These polymers have been heralded as the next-generation structural materials.

It is known that isotropic and biaxially oriented PBZ films can be rendered electrically conductive via $^{84}Kr^+$-ion implantation. Conductivity as high as 100 S/cm for biaxial oriented film has been achieved. It is also known that a PBZ film can be reduced electrochemically to a conductivity of about $20\pm10$ S/cm. This is in accord with the fact that PBZ is known to be a π-deficient aromatic system as evidenced by both chemical and spectroscopic studies. Certain derivatized PBZ polymers have also exhibited $\chi^{(3)}$ non-linear optical (NLO) properties and ionic conductivity.

It is therefore an object of the present invention to provide novel benzobisazole polymers containing functional groups for multifunctional high performance applications.

Other objects and advantages of the present invention will be apparent to those skilled in the art.

SUMMARY OF THE INVENTION

In accordance with the present invention there are provided novel benzobisazole polymers having repeating units of the formula:

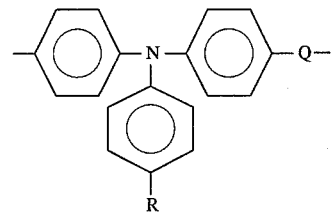

wherein R is selected from the group consisting of —H, —CH$_3$, —N(CH$_3$)$_2$ and —OH, and Q is

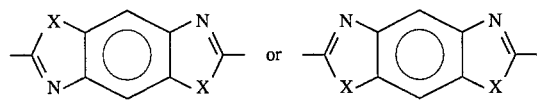

wherein X is —S— or —O—.

The polymers of this invention are prepared by the polycondensation of a diaminobenzenedithiol or a diaminobenzenediol with a dicyano- or dicarboxylic acid triarylamine, as shown below. Briefly, the polymerization process comprises the following steps: (i) dehydrochlorination of a diamino-benzenedithiol dihydrochloride or a diamino-benzenediol dihydrochloride in the presence of a dinitrile or dicarboxylic acid monomer in 77% polyphosphoric acid (PPA) at 50°–65° C.; (ii) addition of P$_2$O$_5$ to raise the P$_2$O$_5$ content of the medium to 83%; (iii) chain propagation and cyclodehydration; and (iv) precipitation of the polymer into water, followed by washing the polymer with ammonium hydroxide and with hot water and drying the polymer in vacuum at 110° C. The polymerization reaction is, for example:

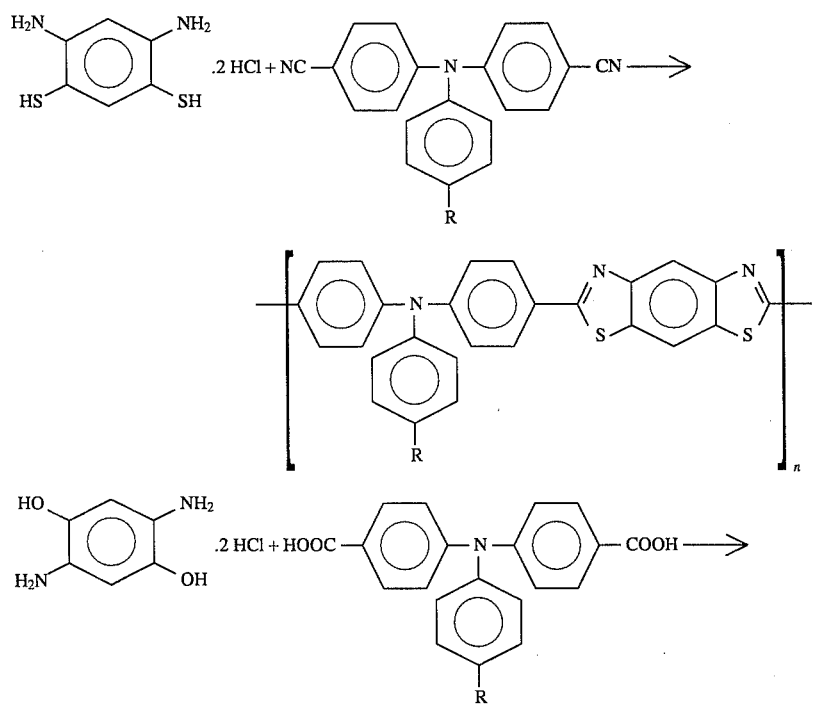

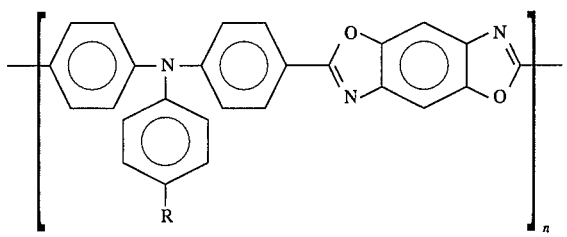

The triarylamine monomer can be prepared by the cesium fluoride-promoted, aromatic nucleophilic displacement reaction of 4-fluorobenzonitrile by aniline and certain para-substituted derivatives thereof, in an aprotic polar solvent. The dicyano-triarylamine can be prepared as shown by the following reaction scheme:

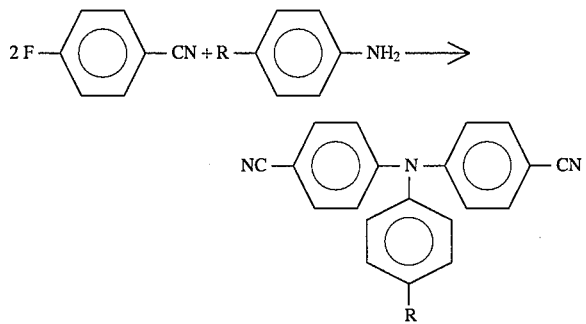

Preparation of the triarylamine monomer is described in our co-pending application Ser. No. 08/380,175, filed of even date herewith. The dinitriles are readily converted to the corresponding dicarboxylic acid monomers under either acidic or basic conditions. Acidic hydrolysis comprises, for example, refluxing the dicyano compound in a mixture of acetic acid and HBr. Basic hydrolysis comprises, for example, refluxing the dicyano compound in a mixture of KOH, ethylene glycol and water, followed by acidic work-up.

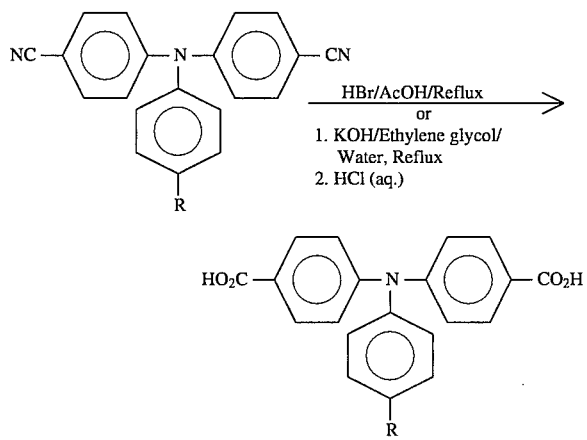

The polymers of this invention can be cast into film or fiber at the time of precipitation (step iv, above); alternatively, they can be precipitated, washed and dried as discussed previously, then dissolved in a strong acid, such as methanesulfonic acid (MSA), then spin-cast into fibers or cast into film. The polymers of this invention exhibit increased electrical conductivity, as compared to the poly(p-phenylene benzobisazole) polymers. The polymers of this invention can be treated with iodine to further increase their electrical conductivity.

The following examples illustrate the invention:

EXAMPLE I

Preparation of Poly(benzo(1,2-d:4,5-d')bisthiazole-2,6-diyl-1,4-phenylenephenylimino- 1,4-phenylene) PBT(H)

Into a four-neck, 150 ml reaction flask were accurately weighed 4, 4'-dicyano-triphenylamine (3.0000 g, 10.16 mmol), 2,5-diamino-1,4-benzenedithiol dihydrochloride (DABDT.2HCl, 2.4906 g, 10.16 mmol) and polyphosphoric acid (PPA, 77%, 26.11 g). The reaction vessel was fitted with a mechanical stirrer, nitrogen inlet/outlet adaptors and a glass stopper. The reaction mixture was initially flushed with nitrogen and then stirred under vacuum (using a water aspirator) for 2 hours at room temperature. The resultant light brown mixture was then heated to 45° C. under vacuum. During heating, it gradually became reddish-orange. The reddish orange solution was stirred at 45° C. for 16 h, at 60° C. for 4 h and at 100° C. for 2 hours. On completion of degassing, the mixture was cooled and 12.79 g of 99.9% phosphorus pentoxide ($P_2O_5$) was added to adjust the PPA concentration to 83%. The red solution was then slowly heated to 100° C. and stirred at 100° C. for 16 h. Subsequently the reaction mixture was heated at 130° C. for 16 h. The reddish-black solution was heated at 145° C. for 2 h, at this stage the solution became highly viscous. The reaction mixture was immediately worked up by pouring it in water. The precipitated polymer was chopped in a high speed blender. The fibrous polymer was neutralized with $NH_4OH$, washed with boiling water for 16 h, filtered and dried under vacuum at 110° C. for 16 h.

Yield: 4.00 g (91%). (η)=0.43 dL/g (methanesulfonic acid, 30° C.). Elemental Analysis:

|  | C | H | N |
| --- | --- | --- | --- |
| Calculated: | 72.03 | 3.48 | 9.69 |
| Found: | 68.46 | 3.20 | 9.20 |

EXAMPLE II

Preparation of Poly(benzo(1,2-d:4,5-d')bisthiazole-2, 6-diyl-1,4-phenylene-((4 -(dimethylamino)phenyl)imino)-1,4-phenylene) PBT(NMe₂)

Into a four-neck, 150 ml reaction flask were accurately weighed, 4, 4'-dicyano-4"-dimethylamino-triphenylamine, (3.5000 g, 10.34 mmol), 2,5 -diamino-1,4-benzenedithiol dihydrochloride, (DABDT.2HCl, 2.5359 g, 10.34 mmol) in PPA (77%, 29.55 g). The reaction vessel was fitted with a mechanical stirrer, nitrogen inlet/outlet adaptors and a glass stopper. The reaction mixture was initially flushed with nitrogen and then stirred under vacuum (using a water aspirator) for 2 hours at room temperature. Then, the reaction mixture was heated at 45° C. for 16 h, 80° C. for 3 h, at which time $P_2O_5$ (14.02 g) was added. The resulting mixture was heated at 100° C. for 16 h, 120° C. for 3 h, and 140° C. for 16 h. The reddish-black solution was slightly viscous and was further heated at 160° C. for 4 h and at 175° C. for 2 h. The reaction mixture was allowed to cool to about 50°–60° C. poured into water. The precipitated polymer was chopped in a high speed blender. The fibrous polymer was neutralized with $NH_4OH$, washed with boiling water for 16 h, filtered and dried under vacuum at 110° C. for 16 h. Yield: 4.42 g (90%). (η)=2.20 dL/g (methanesulfonic acid, 30° C.). Elemental Analysis:

|  | C | H | N |
|---|---|---|---|
| Calculated: | 72.03 | 3.48 | 9.69 |
| Found: | 71.68 | 3.33 | 9.50 |

EXAMPLE III

Preparation of Poly(benzo(1,2-d:4,5-d')bisthiazole-2,6-diyl-1,4-phenylene-((4-methylphenyl)imino)-1,4-phenylene) PBT(CH₃)

Into a four-neck, 150 ml reaction flask were accurately weighed 4,4'-dicyano-4'''-methyl-triphenylamine (1.5000 g, 4.848 mmol), 2,5-diamino-1,4-benzenedithiol dihydrochloride (DABDT.2HCl, 1.1888 g, 4.848 mmol) and polyphosphoric acid (PPA, 77%, 12.94 g). The reaction vessel was fitted with a mechanical stirrer, nitrogen inlet/outlet adaptors and a glass stopper. The reaction mixture was initially flushed with nitrogen and then stirred under vacuum (using a water aspirator) for 2 hours at room temperature. The resultant light brown mixture was then heated to 45° C. under vacuum. During heating, it gradually become reddish-orange. The reddish orange solution was stirred at 45° C. for 16 h, and at 60° C. for 48 h. On completion of degassing, the mixture was cooled and 6.25 g of 99.9% phosphorus pentoxide ($P_2O_5$) was added to adjust the PPA concentration to 83%. The red solution was then slowly heated to 100° C. and stirred at 100° C. for 16 h. Subsequently the reaction mixture was heated at 130° C. for 2 h. The reddish-black solution was heated at 145° C. for 0.5 h, at this stage the solution became highly viscous. The reaction mixture was immediately worked up by pouring it in water. The precipitated polymer was chopped in a high speed blender. The fibrous polymer was neutralized with $NH_4OH$, washed with boiling water for 16 h, filtered and dried under vacuum at 100° C. for 24 h. Yield: 1.97 g (91%). (η)=2.05 dL/g (methanesulfonic acid, 30° C.). Elemental Analysis:

|  | C | H | N |
|---|---|---|---|
| Calculated: | 72.45 | 3.83 | 9.39 |
| Found: | 70.98 | 3.76 | 9.41 |

EXAMPLE IV

Preparation of Poly(benzo(1,2-d:4,5-d')bisthiazole-2,6-diyl-1,4-phenylene-((4-hydroxylphenyl)imino)-1,4-phenylene) PBT(OH)

In a four neck reaction flask was accurately weighed 4,4'-dicyano-4''-methoxy-triphenylamine (1.0000 g, 3.07 mmol), 2,5-diamino-1,4-phenylenedithiol dihydrochloride (DABDT.2HCl, 0.7536 g, 3.07 mmol) and PPA 77% 8.21 g) The flask was fitted with a mechanical stirrer and deaerated with nitrogen. The light brown mixture was stirred at room temperature for 2 h, at 40° C. for 2 h at 60° C. for 3 h and 70° C. for 48 h. On completion of degassing, the dark viscous solution was cooled and 99.9% phosphorus pentoxide ($P_2O_5$, 4.00 g) was added. The solution was then heated and stirred at 120° C. for 16 h and at 140° C. for 2 h. The solution became highly viscous and climbed the shaft. The viscous dope was heated at 160° C. for 1 h and at 170° C. for 1 h. The polymerization was precipitated in water and chopped in a high speed blender. The polymer was neutralized with 10% aqueous $NH_4OH$, washed and Soxhlet extracted with water for 24 h, filtered and dried under vacuum at 110° C. for 24 h. Yield: 1.25 g (91%). (η)=1.05 dL/g (methanesulfonic acid, 30° C.). Elemental Analysis:

|  | C | H | N | P |
|---|---|---|---|---|
| Calculated: | 69.46 | 3.36 | 9.35 |  |
| Found: | 58.65 | 3.22 | 9.09 | 4.20 |

The results from thermogravimetric-mass spectroscopic (TG-MS) study of the polymer and model compound synthesis suggested the polymer structure contains both phenolic and phosphonic moieties.

EXAMPLE V

Preparation of Poly(benzo(1,2-d:4,5-d')bisthiazole-2,6-diyl-1,4-phenylene-((4-methylphenyl)imino)-1,4-phenylene) PBO(CH₃)

Into a four neck reaction flask was placed 4-methyl-triphenylamine-4',4''-dicarboxylic acid, (1.4000 g, 4.03 mmol.), 4,6-diamino-1,3-benzenediol dihydrochloride (0.8587 g., 4.03 mmol.) and PPA (12.95 g). The light yellow solution was degassed at 60° C. for 48 h. under nitrogen. The reaction mixture was cooled to 30° C., and 6.00 g. of anhydrous $P_2O_5$ was added. The color changed to a metallic brown at 80° C. and reddish-black at 90° C. and was homogeneous. On stirring at 120° C. for 1 h, the solution became highly viscous and was cooled and precipitated in water. Upon treatment with 50% $NH_4OH$, the dark reddish polymer changed its color to dark green. The polymer was washed with water in a Soxhlet extractor for 24 h, and dried under vacuum at 100° C. for 24 h. Yield: 1.47 g (87%). Elemental Analysis:

|  | C | H | N |
|---|---|---|---|
| Calculated: | 78.06 | 4.12 | 10.11 |
| Found: | 74.46 | 3.95 | 9.29 |

The polymer was insoluble and formed gels in methanesulfonic acid.

EXAMPLE VI

Preparation of Poly(benzo(1,2-d:4,5-d')bisoxazole-2,6-diyl-1,4-phenylene-((4-(dimethylamino)phenyl)imino)-1,4-phenylene) PBO(NMe$_2$)

Into a four neck reaction flask was placed 4,4'-dicyano-4"-dimethylamino-triphenylamine, (1.2000 g, 3.187 mmol), 4,6-diamino-1,3-benzenediol dihydrochloride, (DABDO.2HCl, 0.6792 g, 3.187 mmol) and PPA (77%, 8.42 g). The light yellow solution was degassed at 60° C. for 48 h. under nitrogen. The reaction mixture was cooled to 30° C., and 4.12 g. of anhydrous P$_2$O$_5$ was added. The resultant red solution was stirred at 80° C. for 4 h, at 120° C. for 16 h, 140° C. for 16 h, and 180° C. for 2 h. The dark red solution was cooled, precipitated in water, chopped in a blender neutralized and washed with boiling water for 16 h. The polymer was filtered and dried under vacuum at 100° C. Yield: 1 28 g (92%). (η)=0.53 dL/g (methanesulfonic acid, 30° C.). Elemental Analysis:

|  | C | H | N |
|---|---|---|---|
| Calculated: | 75.66 | 4.54 | 12.60 |
| Found: | 73.28 | 4.41 | 12.30 |

Example VII

Electrical Conductivity

For conductivity measurements, films of poly(p-phenylene benzobisthiazole) and triarylamine-based PBZ polymer were cast from methanesulfonic acid (MSA) solution under reduced pressure at 60° C. To minimize the effect of any residual MSA on the conductivity, all films were thoroughly washed with ammonium hydroxide and distilled water. For the pristine PBT(NMe$_2$) polymer (Example II), its film conductivity was 2.0×10$^{-9}$ S/cm while the film conductivity of poly(p-phenylene benzobisthiazole) was less than 10$^{-12}$ S/cm. Thus, the incorporation of triarylamine groups increased the conductivity values by at least 3 orders of magnitude.

The cast films of unmodified poly(p-phenylene benzobisthiazole) and PBT(NMe$_2$) polymers were exposed to iodine vapors and were monitored for color changes. The poly(p-phenylene benzobisthiazole) film required several hours to activate the polymer with iodine; in contrast, only 2–3 hours were required to activate the triarylamine-PBZ polymers. On removal of the film from the iodine chamber, the poly(p-phenylene benzobisthiazole) returned to the pristine state in a few hours. The triarylamine-PBZ polymers on the other hand, stayed activated over longer periods (several months). The highest electrical conductivity of the activated (metallic grayish black) film of polymer PBT(NMe$_2$) was 2.3×10$^{-8}$ S/cm.

Various modifications may be made in the instant invention without departing from the spirit and scope of the appended claims.

We claim:

1. A polymer having repeating units of the formula:

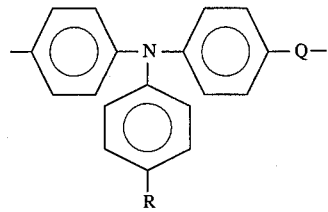

wherein R is selected from the group consisting of —H, —CH$_3$, —N(CH$_3$)$_2$ and —OH, and Q is

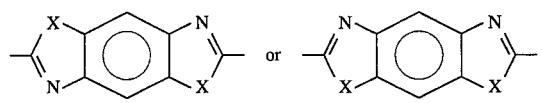

wherein X is —S— or —O—.
2. The polymer of claim 1 wherein X is —S—.
3. The polymer of claim 2 wherein R is —N(CH$_3$)$_2$.
4. The polymer of claim 2 wherein R is —CH$_3$.
5. The polymer of claim 2 wherein R is —OH.
6. The polymer of claim 2 wherein R is —H.
7. The polymer of claim 1 wherein X is —O—.
8. The polymer of claim 7 wherein R is —N(CH$_3$)$_2$.
9. The polymer of claim 7 wherein R is —CH$_3$.
10. The polymer of claim 7 wherein R is —OH.
11. The polymer of claim 7 wherein R is —H.

* * * * *